United States Patent
Haba et al.

(10) Patent No.: US 9,631,535 B2
(45) Date of Patent: Apr. 25, 2017

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi (JP)

(72) Inventors: Yuki Haba, Mishima (JP); Yusuke Nozaki, Gotenba (JP); Kohei Yoshida, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/911,364

(22) PCT Filed: Jul. 3, 2014

(86) PCT No.: PCT/JP2014/068371
§ 371 (c)(1),
(2) Date: Feb. 10, 2016

(87) PCT Pub. No.: WO2015/029611
PCT Pub. Date: Mar. 5, 2015

(65) Prior Publication Data
US 2016/0186627 A1    Jun. 30, 2016

(30) Foreign Application Priority Data
Aug. 26, 2013    (JP) .................................. 2013-174443

(51) Int. Cl.
*F01N 3/00* (2006.01)
*F01N 3/08* (2006.01)
(Continued)

(52) U.S. Cl.
CPC ......... *F01N 3/0814* (2013.01); *F01N 3/0842* (2013.01); *F01N 3/0871* (2013.01);
(Continued)

(58) Field of Classification Search
CPC ........ F01N 3/0842; F01N 3/0871; F01N 3/36; F01N 11/00; F01N 11/002
(Continued)

(56) References Cited

U.S. PATENT DOCUMENTS

2004/0050037 A1* 3/2004 Betta .................. B01D 53/9431
60/286
2010/0242459 A1 9/2010 Tsujimoto et al.
(Continued)

FOREIGN PATENT DOCUMENTS

EP          2610450 A1    7/2013
JP       2003-120392 A    4/2003
(Continued)

OTHER PUBLICATIONS

U.S. Appl. No. 14/784,236.

*Primary Examiner* — Jason Shanske
(74) *Attorney, Agent, or Firm* — Oliff PLC

(57) ABSTRACT

In an internal combustion engine, a hydrocarbon feed valve (15) and an exhaust purification catalyst (13) are arranged in an engine exhaust passage. When releasing the stored $NO_x$ from the exhaust purification catalyst (13), usually combustion gas of a rich air-fuel ratio is generated in the combustion chamber (2) to make the air-fuel ratio of the exhaust gas flowing into the exhaust purification catalyst (13) rich. When releasing the stored $NO_x$ from the exhaust purification catalyst (13) in case where the temperature of the exhaust purification catalyst (13) is low, the air-fuel ratio of the exhaust gas flowing into the exhaust purification catalyst (13) is made rich by injecting hydrocarbons from the hydrocarbon feed valve (15).

4 Claims, 14 Drawing Sheets

(51) Int. Cl.
*F01N 3/36* (2006.01)
*F01N 11/00* (2006.01)

(52) U.S. Cl.
CPC ............... *F01N 3/36* (2013.01); *F01N 11/00* (2013.01); *F01N 11/002* (2013.01); *F01N 2610/03* (2013.01); *F01N 2900/1602* (2013.01); *F01N 2900/1614* (2013.01); *Y02C 20/10* (2013.01); *Y02T 10/47* (2013.01)

(58) Field of Classification Search
USPC ......................................................... 60/286
See application file for complete search history.

(56) References Cited

U.S. PATENT DOCUMENTS

| | | | |
|---|---|---|---|
| 2012/0124971 | A1 | 5/2012 | Bisaiji et al. |
| 2013/0149198 | A1 | 6/2013 | Umemoto et al. |

FOREIGN PATENT DOCUMENTS

| | | | |
|---|---|---|---|
| JP | 2009-041489 | A | 2/2009 |
| JP | 2009-257226 | A | 11/2009 |
| WO | 2009/082035 | A1 | 7/2009 |
| WO | 2011/114501 | A1 | 9/2011 |
| WO | 2012/029190 | A1 | 3/2012 |

\* cited by examiner

FIG. 1
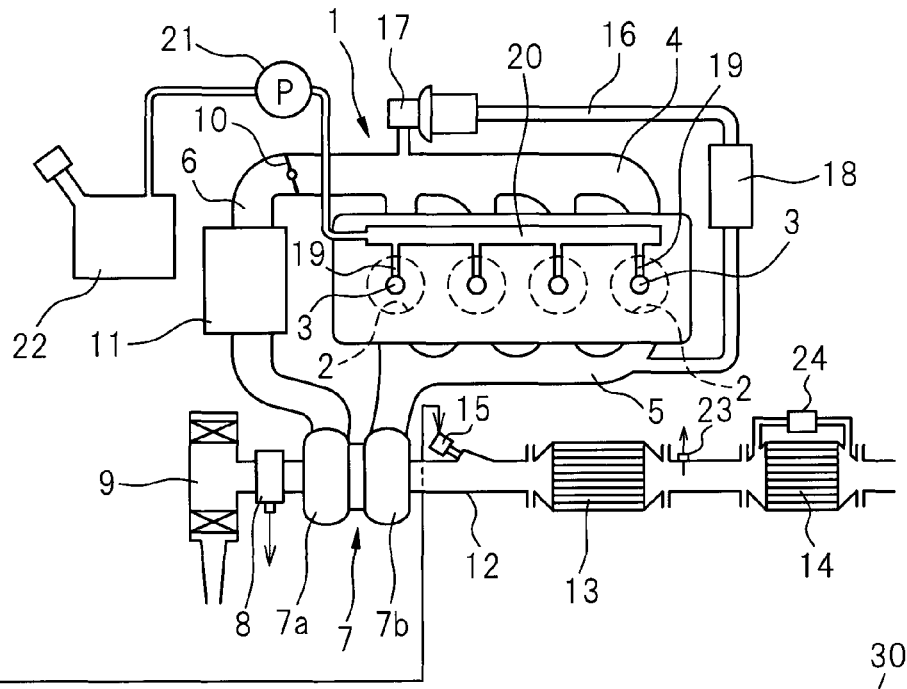
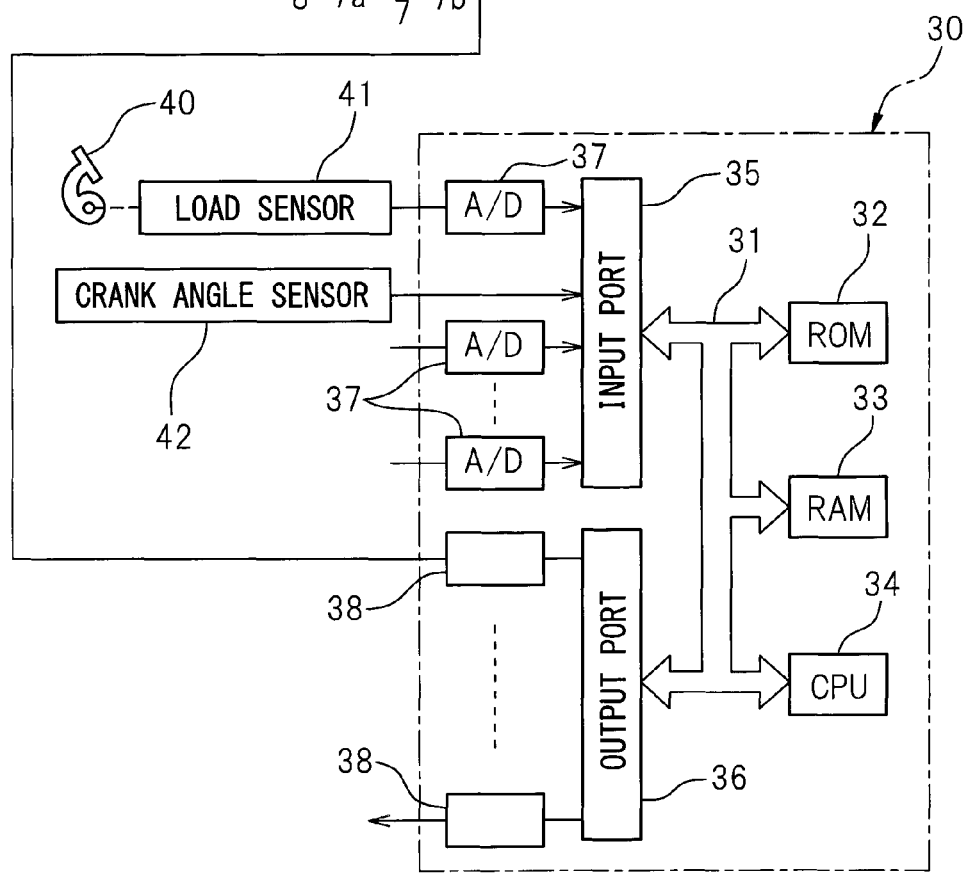

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine in which an $NO_x$ storage catalyst storing $NO_x$ when the air-fuel ratio of the exhaust gas is lean and releasing the stored $NO_x$ when the air-fuel ratio of the exhaust gas is made rich is arranged in the engine exhaust passage, a hydrocarbon feed valve is arranged in the engine exhaust passage upstream of the $NO_x$ storage catalyst, and when releasing the $NO_x$, which was stored in the $NO_x$ storage catalyst when the air-fuel ratio of the exhaust gas was lean, from the $NO_x$ storage catalyst, the air-fuel ratio of the exhaust gas flowing into the $NO_x$ storage catalyst is made rich by injecting hydrocarbons from the hydrocarbon feed valve into the exhaust gas in accordance with the opening timing of the exhaust, valve or the air-fuel ratio of the exhaust gas flowing into the $NO_x$ storage catalyst is made rich by performing a post injection which injects fuel into the high temperature and high pressure gas in the combustion chamber before the exhaust valve opens (for example, see PTL 1).

CITATION LIST

Patent Literature

PTL 1. Japanese Patent Publication No. 2009-41489A

SUMMARY OF INVENTION

Technical Problem

In this internal combustion engine, the longer the time from when the post injection is performed to when the exhaust valve opens, that is, the more the opening timing of the exhaust valve is retarded, the more the evaporation or heat decomposition of the injected fuel progresses and, as a result, the better $NO_x$ can be made to be released from the $NO_x$ storage catalyst. As opposed to this, the shorter the time from when the post injection is performed to when the exhaust valve opens, that is, the more the opening timing of the exhaust valve is advanced, the higher the exhaust temperature becomes. Therefore, at this time, if injecting hydrocarbons from the hydrocarbon feed valve, evaporation or heat decomposition of the injected hydrocarbon will progress and, as a result, $NO_x$ can be made to release from the $NO_x$ storage catalyst well. Therefore, in this internal combustion engine, to release $NO_x$ from the $NO_x$ storage catalyst well, when the opening timing of the exhaust valve is retarded, the air-fuel ratio of the exhaust gas flowing into the $NO_x$ storage catalyst is made rich by performing the post injection, while when the opening timing of the exhaust valve is advanced, the air-fuel ratio of the exhaust gas flowing into the $NO_x$ storage catalyst is made rich by injecting hydrocarbons from the hydrocarbon feed valve.

In this way, in this internal combustion engine, when releasing $NO_x$ from the $NO_x$ storage catalyst, the air-fuel ratio of the exhaust gas flowing into the $NO_x$ storage catalyst is made rich by performing the post injection or by injecting hydrocarbons from the hydrocarbon feed valve. However, there is the problem that, even if performing the post injection or injecting hydrocarbons from the hydrocarbon feed valve, it is difficult to release $NO_x$ from the $NO_x$ storage catalyst well and, therefore, a good $NO_x$ purification rate cannot be obtained. As opposed to this, if generating combustion gas of a rich air-fuel ratio in the combustion chamber to thereby make the air-fuel ratio of the exhaust gas flowing into the exhaust purification catalyst rich, $NO_x$ can be released from the $NO_x$ storage catalyst well and therefore a good $NO_x$ purification rate can be obtained. However, even when, in this way, combustion gas of a rich air-fuel ratio is generated in the combustion chamber, if the temperature of the $NO_x$ storage catalyst is low, the $NO_x$ purification rate is not sufficient. In this case, to obtain a high $NO_x$ purification rate, it is necessary to raise the temperature of the $NO_x$ storage catalyst.

An object of the present invention is to provide an exhaust purification system of an internal combustion engine in which, when releasing $NO_x$ from an exhaust purification catalyst in case where the temperature of the exhaust purification catalyst is low, a high $NO_x$ purification rate can be quickly obtained by quickly raising the temperature of the catalyst while releasing $NO_x$ from the exhaust purification catalyst.

Solution to Problem

According to the present invention, there is provided an exhaust purification system of an internal combustion engine comprising an exhaust purification catalyst arranged in an engine exhaust passage and a hydrocarbon feed valve arranged in the engine exhaust passage upstream of the exhaust purification catalyst, a precious metal catalyst being carried on an exhaust gas flow surface of the exhaust purification catalyst, a basic layer being formed around the precious metal catalyst, and an air-fuel ratio of an exhaust gas flowing into the exhaust purification catalyst being made rich when releasing $NO_x$ which is stored in the basic layer from the exhaust purification catalyst, wherein, when releasing the stored NOX from the exhaust purification catalyst, the air-fuel ratio of the exhaust gas flowing into the exhaust purification catalyst is made rich by generating combustion gas of a rich air-fuel ratio in a combustion chamber or the air-fuel ratio of the exhaust gas flowing into the exhaust purification catalyst is made rich by injecting hydrocarbons from the hydrocarbon feed valve into the engine exhaust passage, and, in case where hydrocarbons are injected from the hydrocarbon feed valve into the engine exhaust passage to release the stored $NO_x$ from the exhaust purification catalyst, an amount of injection of hydrocarbons from the hydrocarbon feed valve is made greater when a temperature of the exhaust purification catalyst is low as compared with when the temperature of the exhaust purification catalyst is high.

Advantageous Effects of Invention

By increasing the amount of injection of hydrocarbons from the hydrocarbon feed valve when the temperature of the exhaust purification catalyst is low as compared with when the temperature of the exhaust purification catalyst is high, it is possible to quickly raise the temperature of the exhaust purification catalyst due to the heat of oxidation reaction of the injected hydrocarbon and thereby quickly obtain high $NO_x$ purification rate.

BRIEF DESCRIPTION OF DRAWINGS

FIG. 1 is an overall view of a compression ignition type internal combustion engine.

DESCRIPTION OF EMBODIMENTS

Figure 2:
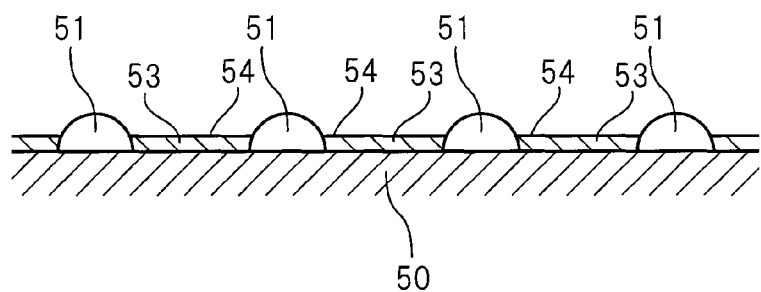
FIG. 2 is a view which schematically shows the surface part of a catalyst carrier.

FIG. 1 is an overall view of a compression ignition type internal combustion engine.

Referring to FIG. 1, 1 indicates an engine body, 2 combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 which is driven by an actuator is arranged. Around the intake duct 6, a cooling device 11 is arranged for cooling the intake air which flows through the inside of the intake duct 6. In the embodiment which is shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7, and an outlet of the exhaust turbine 7b is connected through an exhaust pipe 12 to an inlet of an exhaust purification catalyst 13. In an embodiment of the present invention, this exhaust purification catalyst 13 is comprised of an $NO_x$ storage catalyst 13. An outlet of the exhaust purification catalyst 13 is connected to a particulate filter 14 and, upstream of the exhaust purification catalyst 13 inside the exhaust pipe 12, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling the EGR gas which flows through the inside of the EGR passage 16. In the embodiment which is shown in FIG. 1, the engine cooling water is guided to the inside of the cooling device 18 where the engine cooling water is used to cool the EGR gas. On the other hand, each fuel injector 3 is connected, through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 21 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 is arranged for detecting the temperature of the exhaust gas flowing out from the exhaust purification catalyst 13, and a pressure difference sensor 24 for detecting a pressure difference before and after the particulate filter 14 is attached to the particulate filter 14. The output signals of these temperature sensor 23, pressure difference sensor 24 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the actuator for driving the throttle valve 10, hydrocarbon feed valve 15, EGR control valve 17, and fuel pump 21.

FIG. 2 schematically shows a surface part of a catalyst carrier which is carried on a substrate of the exhaust purification catalyst 13 shown in FIG. 1. At this exhaust purification catalyst 13, as shown in FIG. 2, for example, there is provided a catalyst carrier 50 made of alumina on which precious metal catalysts 51 comprised of platinum Pt are carried. Furthermore, on this catalyst, carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_x$. In this case, on the catalyst carrier 50 of the exhaust purification catalyst 13, in addition to platinum Pt, rhodium Rh or palladium Pd may be further carried. Note that the exhaust gas flows along the top of the catalyst carrier 50, so the precious metal catalysts 51 can be said to be carried on the exhaust gas flow surfaces of the exhaust purification catalyst 13. Further, the surface of the basic layer 53 exhibits basicity, so the surface of the basic layer 53 is called the "basic exhaust gas flow surface parts 54".

Figure 3:
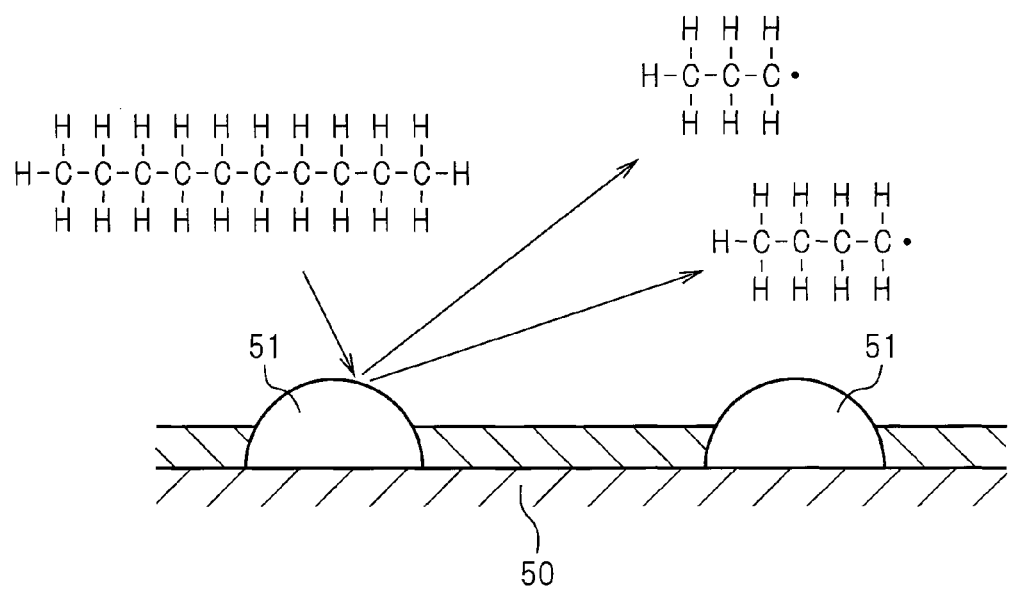
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the precious metal catalyst 51.

Figure 4:
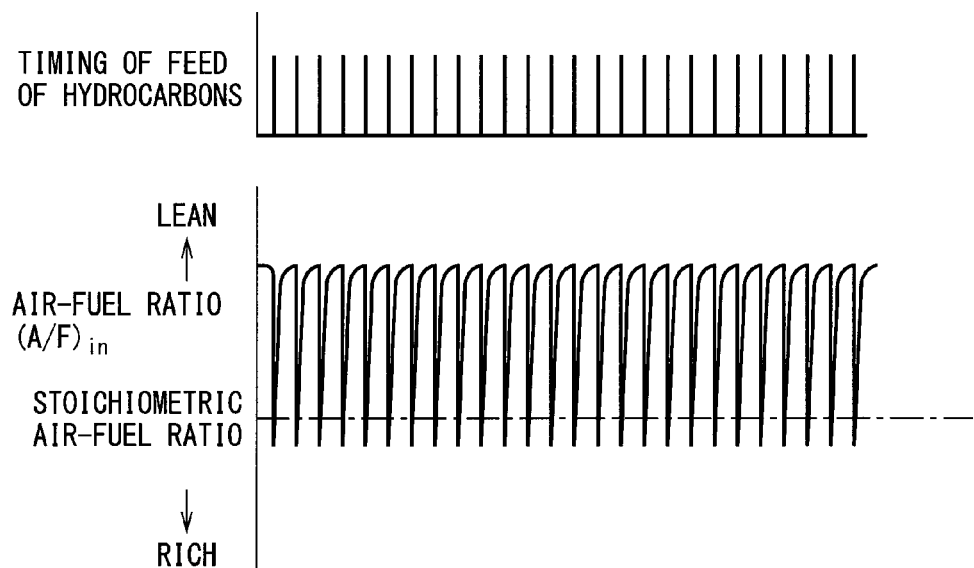
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F) in of the exhaust gas which flows into the exhaust purification catalyst 13. Note that, the change in the air-fuel ratio (A/F) in depends on the change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
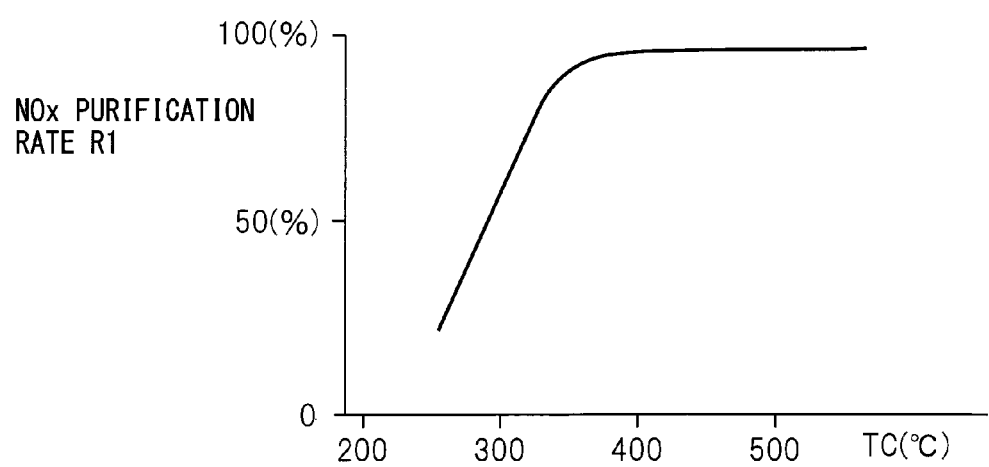
FIG. 5 is a view which shows an $NO_x$ purification rate R1.

FIG. 5 shows the $NO_x$ purification rate R1 by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, periodically make the air-fuel ratio (A/F) in of the exhaust gas flowing to the exhaust purification catalyst 13 rich. In this regard, as a result of a research relating to $NO_x$ purification for a long time, it is learned that if making the concentration of hydrocarbons which flow into the exhaust purification catalyst 13 vibrate by within a predetermined range of amplitude and within a predetermined range of period, as shown in FIG. 5, an extremely high $NO_x$ purification rate R1 is obtained even in a 350° C. or higher high temperature region.

Figure 6A:
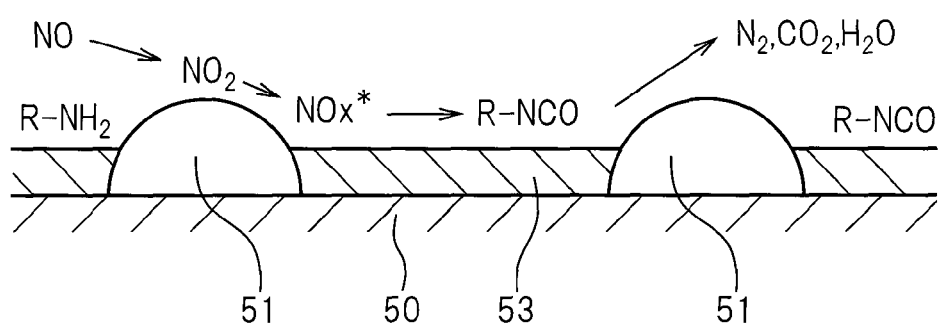
FIGS. 6A and 6B are views for explaining an oxidation reduction reaction in an exhaust purification catalyst.
Figure 6B:
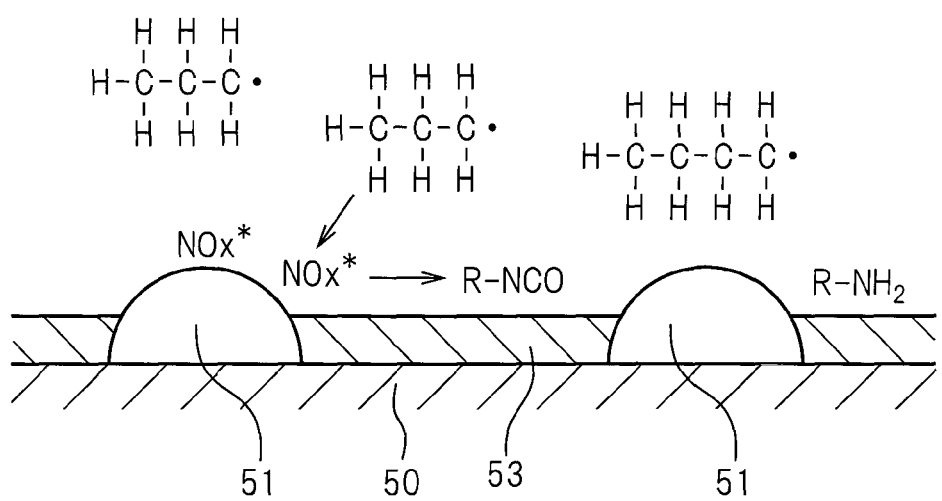

Furthermore, it is learned that at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13, and the reducing intermediates play a central role in obtaining a high $NO_x$ purification rate R1. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the air-fuel ratio (A/F) in of the exhaust gas flowing to the exhaust purification catalyst 13 is made rich, that is, the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_x^*$".

On the other hand, if hydrocarbons are fed from the hydrocarbon feed valve 15 and the air-fuel ratio (A/F) in of the exhaust gas flowing to the exhaust purification catalyst 13 is made rich, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_x^*$ becomes higher. In this regard, if, after the active $NO_x^*$ is produced, the state of a high oxygen concentration around the active $NO_x^*$ continues for a constant time or more, the active $NO_x^*$ is oxidized and is absorbed in the form of nitrate ions $NO_3^-$ inside the basic layer 53. However, if, before this constant time elapses, the hydrocarbon concentration around the active $NO_x^*$ becomes higher, as, shown in FIG. 6B, the active $NO_x^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—$NH_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed, and thereby the concentration of oxygen around the reducing intermediates becomes higher, the reducing intermediates react with the $NO_x$ in the exhaust gas, react with the active $NO_x^*$, react with the surrounding oxygen, or break down on their own. Due to this, the reducing intermediates R—NCO and R—$NH_2$ are converted to $N_2$, $CO_2$, and $H_2O$ as shown in FIG. 6A, therefore the $NO_x$ is removed.

In this way, in the exhaust purification catalyst 13, when the concentration of hydrocarbons which flow into the exhaust purification catalyst 13 is made higher, reducing intermediates are produced, and after the concentration of hydrocarbons which flow into the exhaust purification catalyst 13 is lowered, when the oxygen concentration is raised, the reducing intermediates react with the $NO_x$ in the exhaust gas or the active $NO_x^*$ or oxygen or break down on their own whereby the $NO_x$ is removed. That is, in order for the exhaust purification catalyst 13 to remove the $NO_x$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the $NO_x$ in the exhaust gas or the active $NO_x^*$ or oxygen or break down on their own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface parts 54, until the produced reducing intermediates R—NCO and R—$NH_2$ react with the $NO_x$ in the exhaust gas or the active $NO_x^*$ or oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_x^*$ is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in the embodiment according to the present invention, to react the $NO_x$ contained in the exhaust gas and the reformed hydrocarbons and produce the reducing intermediates R—NCO and R—$NH_2$ containing nitrogen and hydrocarbons, the precious metal catalysts 51 are carried on the exhaust gas flow surfaces of the exhaust purification catalyst 13. To hold the produced reducing intermediates R—NCO and R—$NH_2$ inside the exhaust purification catalyst 13, the basic layers 53 are formed around the precious metal catalysts 51. The reducing intermediates R—NCO and R—$NH_2$ which are held on the basic layer 53 are converted to $N_2$, $CO_2$, and $H_2O$. The vibration period of the hydrocarbon concentration is made the vibration period required for continuation of the production of the reducing intermediates R—NCO and R—$NH_2$.

Incidentally, in the example shown in FIG. 4, the injection interval is made 3 seconds.

Figure 7A:
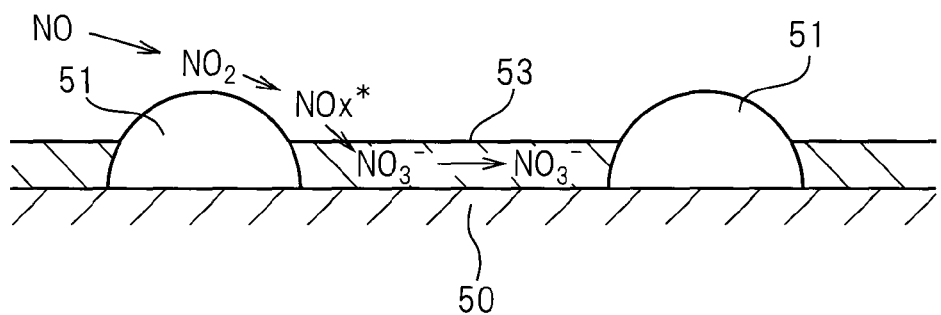
FIGS. 7A and 7B are views for explaining an oxidation reduction reaction in an exhaust purification catalyst.

If the vibration period of the hydrocarbon concentration, that is, the injection period of hydrocarbons from the hydrocarbon feed valve 15, is made longer than the above predetermined range of period, the reducing intermediates R—NCO and R—$NH_2$ disappear from the surface of the basic layer 53. At this time, the active $NO_x^*$ which is produced on the platinum Pt 53, as shown in FIG. 7A, diffuses in the basic layer 53 in the form of nitrate ions $NO_3^-$ and becomes nitrates. That is, at this time, the $NO_x$ in, the exhaust gas is absorbed in the form of nitrates inside of the basic layer 53.

Figure 7B:
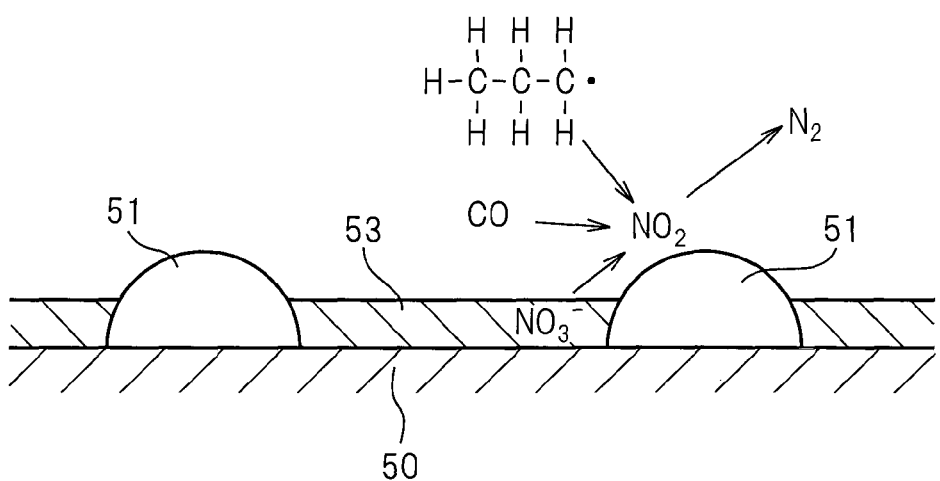

On the other hand, FIG. 7B shows the case where the air-fuel ratio of the exhaust gas which flows into the exhaust purification catalyst 13 is made rich when the NO is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$ and, as shown in FIG. 7B, are released from the basic layer 53 in the form of $NO_2$. Next, the released $NO_2$ is reduced by the hydrocarbons HC and CO contained in the exhaust gas.

Figure 8:
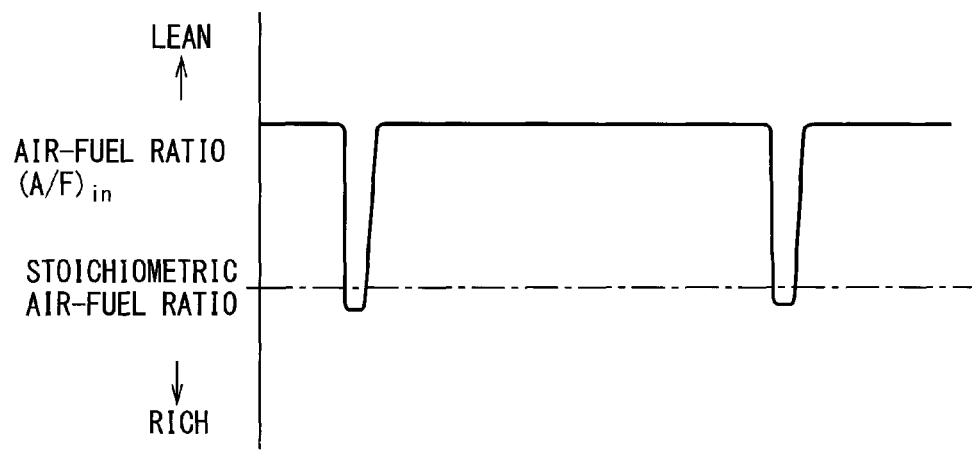
FIG. 8 is a view which shows changes in an air-fuel ratio of exhaust gas which flows into an exhaust purification catalyst.

FIG. 8 shows the case of making the air-fuel ratio (A/F) in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of "storage" as a term including both "absorption" and "adsorption", at this time, the basic layer 53 performs the role of an $NO_x$ storage agent for temporarily storing the $NO_x$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
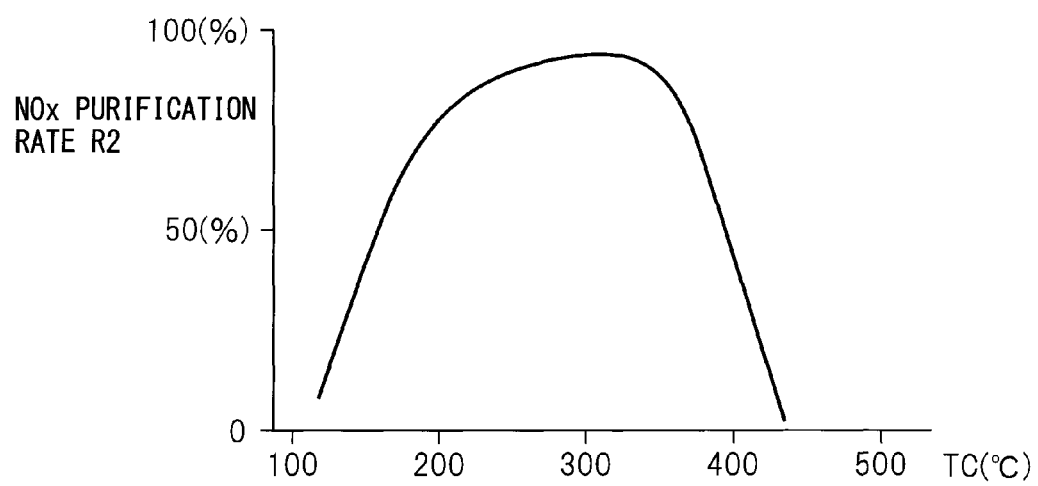
FIG. 9 is a view which shows an $NO_x$ purification rate R2.

The solid line of FIG. 9 shows the $NO_x$ purification rate R2 when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 250° C. to 300° C., an extremely high $NO_x$ purification rate is obtained, but when the catalyst temperature TC becomes a 350° C. or higher high temperature, the $NO_x$ purification rate R2 falls.

In this way, when the catalyst temperature TC becomes 350° C. or more, the $NO_x$ purification rate R2 falls because if the catalyst temperature TC becomes 350° C. or more, $NO_x$ is less easily stored and the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate R2. However, in the new $NO_x$ purification method shown from FIG. 4 to FIGS. 6A and 6B, the amount of $NO_x$ stored in the form of nitrates is small, and consequently, as shown in FIG. 5, even when the catalyst temperature TC is high, a high $NO_x$ purification rate R1 is obtained.

In the embodiment according to the present invention, to be able to purify $NO_x$ by using this new $NO_x$ purification method, a hydrocarbon feed valve 15 for feeding hydrocarbons is arranged in the engine exhaust passage, an exhaust purification catalyst 13 is arranged in the engine exhaust passage downstream of the hydrocarbon feed valve 15, precious metal catalysts 51 are carried on the exhaust gas flow surfaces of the exhaust purification catalyst 13, the basic layers 53 are formed around the precious metal catalysts 51, the exhaust purification catalyst 13 has the property of reducing the $NO_x$ contained in exhaust gas by the reducing intermediates which are held on the basic layers 53 if hydrocarbons are injected from the hydrocarbon feed valve 15 within a predetermined range of period and has the property of being increased in storage amount of $NO_x$ contained in exhaust gas if making the injection period of the hydrocarbon from the hydrocarbon feed valve 15 longer than this predetermined range, and, at the time of engine operation, the hydrocarbons are injected from the hydrocarbon feed valve 15 within the predetermined range of period to thereby reduce the $NO_x$ which is contained in the exhaust gas in the exhaust purification catalyst 13.

That is, the $NO_x$ purification method which is shown from FIG. 4 to FIGS. 6A and 6B can be said to be a new $NO_x$ purification method designed to remove $NO_x$ without forming so much nitrates in the case of using an exhaust purification catalyst which carries precious metal catalysts and forms a basic layer which can absorb $NO_x$. In actuality, when using this new $NO_x$ purification method, the nitrates which are detected from the basic layer 53 are smaller in amount compared with the case where making the exhaust purification catalyst 13 function as an $NO_x$ storage catalyst. Note that, this new $NO_x$ purification method will be referred to below as the "first $NO_x$ purification method".

Figure 10:
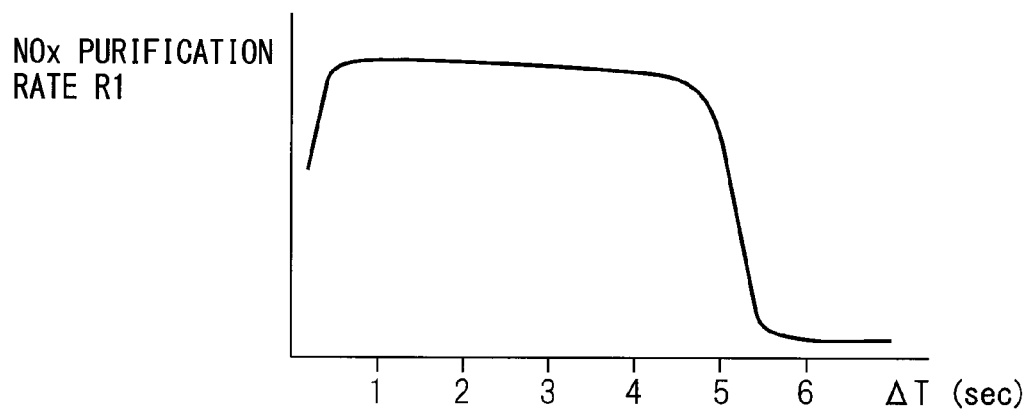
FIG. 10 is a view which shows a relationship between a vibration period ΔT of hydrocarbon concentration and an $NO_x$ purification rate R1.

Now, as mentioned before, if the injection period $\Delta T$ of the hydrocarbons from the hydrocarbon feed valve 15 becomes longer, the time period in which the oxygen concentration around the active $NO_x^*$ becomes higher becomes longer in the time period after the hydrocarbons are injected to when the hydrocarbons are next injected. In this case, in the embodiment shown in FIG. 1, if the injection period $\Delta T$ of the hydrocarbons becomes longer than about 5 seconds, the active $NO_x^*$ starts to be absorbed in the form of nitrates inside the basic layer 53. Therefore, as shown in FIG. 10, if the vibration period $\Delta T$ of the hydrocarbon concentration becomes longer than about 5 seconds, the $NO_x$ purification rate R1 falls. Therefore, the injection period $\Delta T$ of the hydrocarbons has to be made 5 seconds or less.

On the other hand, in the embodiment of the present invention, if the injection period $\Delta T$ of the hydrocarbons becomes about 0.3 second or less, the injected hydrocarbons start to build up on the exhaust gas flow surfaces of the exhaust purification catalyst 13, therefore, as shown in FIG. 10, if the injection period $\Delta T$ of the hydrocarbons becomes about 0.3 second or less, the $NO_x$ purification rate R1 falls. Therefore, in the embodiment according to the present invention, the injection period of the hydrocarbons is made from 0.3 second to 5 seconds.

Figure 11A:
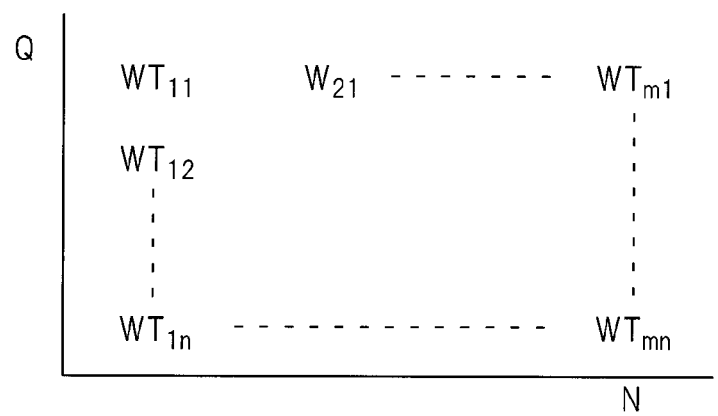
FIGS. 11A and 11B are views which show maps of the injection amount of hydrocarbons etc.
Figure 11B:
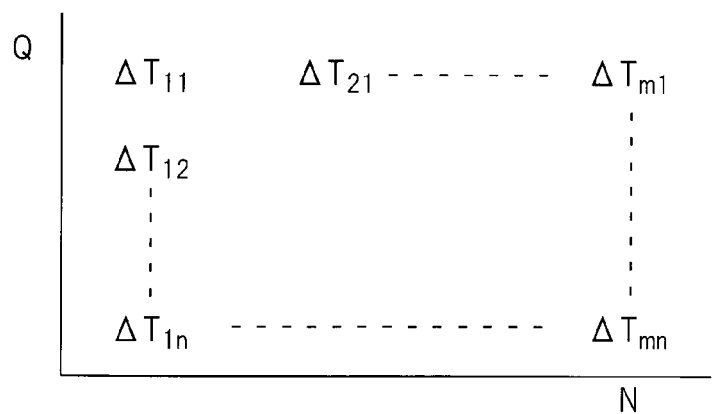

In the embodiment according to the present invention, the injection amount and injection timing of hydrocarbons from the hydrocarbon feed valve 15 which are optimum for ensuring a good $NO_x$ purification action by the first $NO_x$ purification method are obtained in advance. In this case, in the embodiment according to the present invention, the optimum hydrocarbon injection amount WT when the $NO_x$ purification action by the first $NO_x$ purification method is performed is stored as a function of the injection amount Q from fuel injectors 3 and the engine speed N in the form of a map such as shown in FIG. 11A in advance in the ROM 32. Further, the optimum injection period $\Delta T$ of the hydrocarbons at this time is also stored as a function of the injection amount Q from the fuel injectors 3 and the engine speed N in the form of a map such as shown in FIG. 11B in advance in the ROM 32.

Next, referring to FIG. 12 to FIG. 15, an $NO_x$ purification method when making the exhaust purification catalyst 13 function as an $NO_x$ storage catalyst will be explained specifically. The $NO_x$ purification method in the case of making the exhaust purification catalyst 13 function as an $NO_x$ storage catalyst in this way will be referred to below as the "second $NO_x$ purification method".

Figure 12:
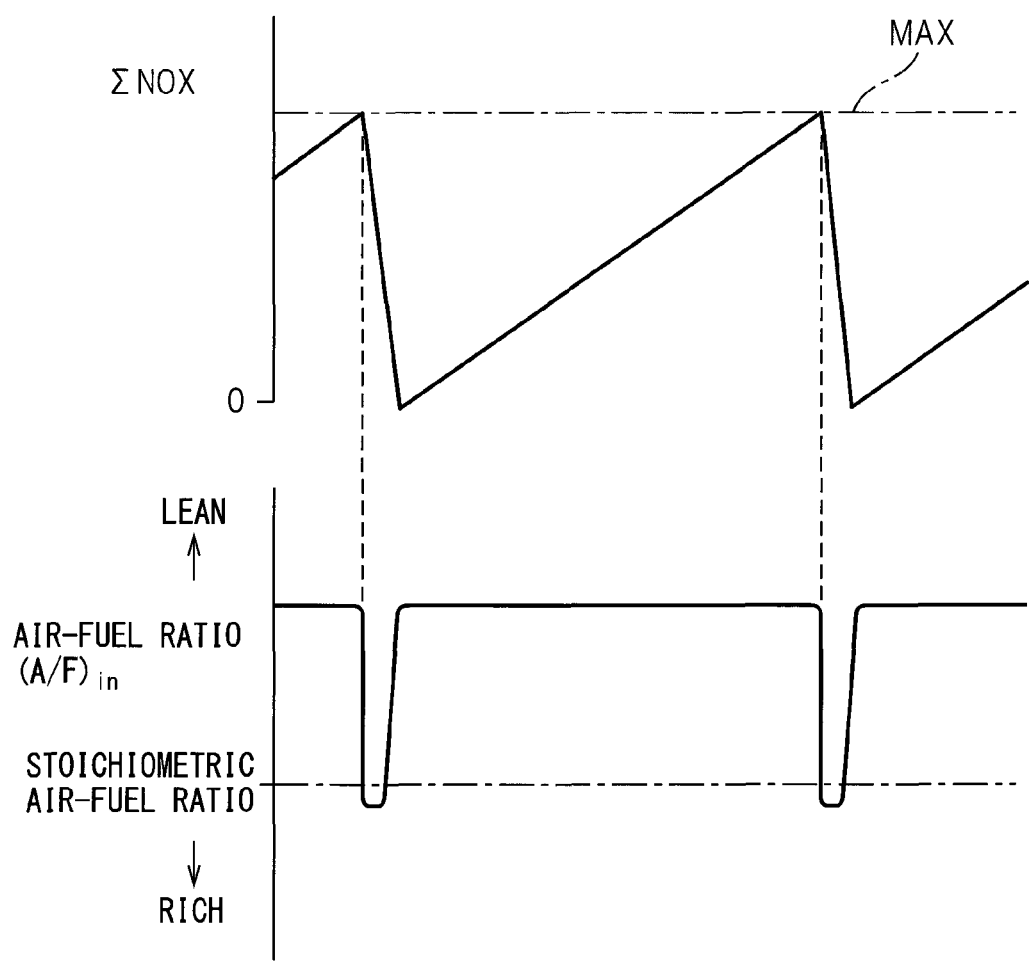
FIG. 12 is a view which shows an $NO_x$ release control.

In this second $NO_x$ purification method, as shown in FIG. 12, when the stored $NO_x$ amount $\Sigma NO_x$ of $NO_x$ which is stored in the basic layer 53 exceeds a predetermined allowable amount MAX, the air-fuel ratio (A/F) in of the exhaust gas flowing into the exhaust purification catalyst 13 is temporarily made rich. If the air-fuel ratio (A/F) in of the exhaust gas is made rich, the $NO_x$ which was stored in the basic layer 53 when the air-fuel ratio (A/F) in of the exhaust gas was lean is released from the basic layer 53 all at once and reduced. Due to this, the $NO_x$ is removed.

Figure 13:
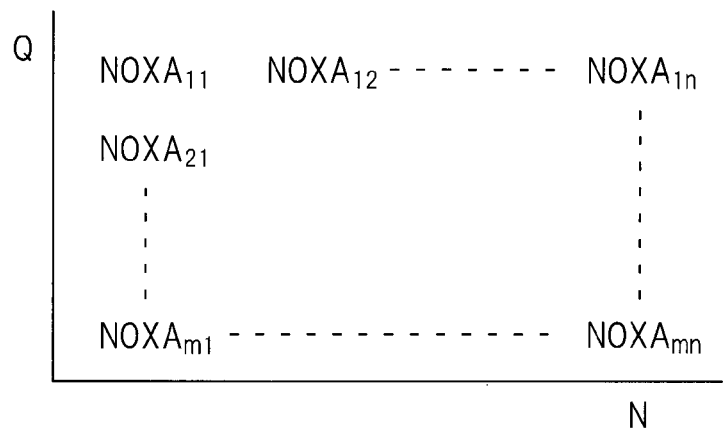
FIG. 13 is a view which shows a map of an exhausted $NO_x$ amount NOXA.

The stored $NO_x$ amount $\Sigma NO_x$ is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 13 in advance in the ROM 32. The stored $NO_x$ amount $\Sigma NO_x$ is calculated from this exhausted $NO_x$ amount NOXA. In this case, as explained before, the period at which the air-fuel ratio (A/F) in of the exhaust gas is made rich is usually 1 minute or more.

Figure 14:
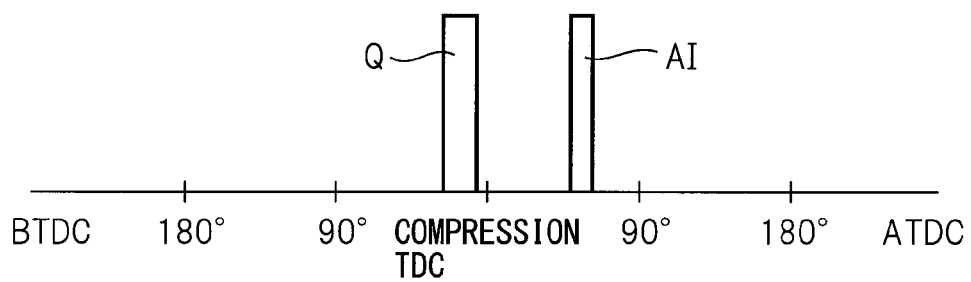
FIG. 14 is a view which shows a fuel injection timing.
Figure 15:
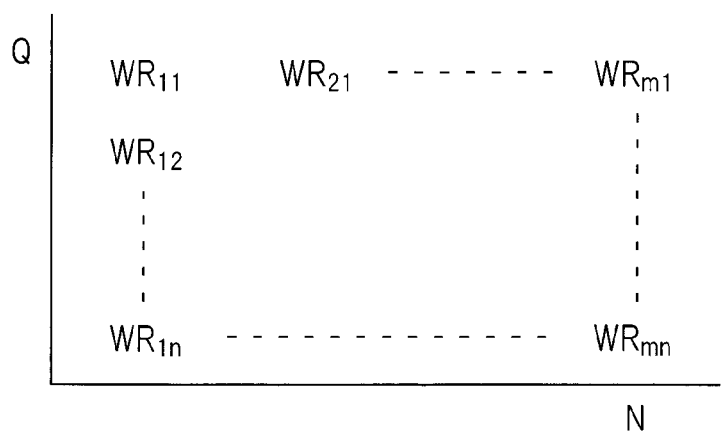
FIG. 15 is a view which shows a map of an additional hydrocarbon feed amount WR of a rich combustion gas generating injection.

In this second $NO_x$ removal method, when performing $NO_x$ release control, as shown in FIG. 14, in addition to the main injection Q from the fuel injector 3 to generate the engine output, injection AI to generate rich combustion gas is performed. Note that, in FIG. 14, the abscissa shows the crank angle. This rich combustion gas generation injection AI is performed at a timing at which the fuel burns, but does not appear as engine output, that is, slightly before ATDC90° after compression top dead center. At this time, the amount WR of fuel which is required for generating combustion gas of a rich air-fuel ratio is injected from the fuel injector 3. This fuel amount WR is stored as a function of the amount of depression L of the accelerator pedal 40 and the engine speed N in the form of the map such as shown in FIG. 15 in advance in the ROM 32. In this way, in an embodiment according to the present invention, when performing control to release $NO_x$, in addition to main injection Q for generating the engine output, the rich combustion gas generation injection AI for generating combustion gas of a rich air-fuel ratio is performed from the fuel injector 3. If this rich combustion gas generation injection AI is performed, the air-fuel ratio of the exhaust gas which is exhausted from the combustion chamber 2 becomes rich, therefore the air-fuel ratio (A/F) in of the exhaust gas which flows into the $NO_x$ storage catalyst 13 becomes rich. As a result, $NO_x$ is released from the $NO_x$ storage catalyst 13.

Now then, in an embodiment according to the present invention, a first $NO_x$ removal method which reduces $NO_x$ contained in the exhaust gas by a reducing intermediate which is held on the basic layer 53 and generated by injecting hydrocarbons from the hydrocarbon feed valve 15 within a predetermined range of period and a second $NO_x$ removal method in which the air-fuel ratio of the exhaust gas flowing into the exhaust purification catalyst 13 is made rich by a period which is longer than the above-mentioned predetermined range to make the $NO_x$ which was stored in the exhaust purification catalyst 13 when the air-fuel ratio of the exhaust gas flowing into the exhaust purification catalyst was lean be released from the exhaust purification catalyst 13 and be reduced are used. In this case, as will be understood if comparing the $NO_x$ removal rate R1 by the first $NO_x$ removal method shown in FIG. 5 and the $NO_x$ removal rate R2 by the second $NO_x$ removal method shown in FIG. 9, when the catalyst temperature TC is relatively low, the $NO_x$ removal, rate R2 by the second $NO_x$ removal method becomes higher, while if the catalyst temperature TC becomes high, the $NO_x$ removal rate R1 by the first $NO_x$ removal method becomes higher. Therefore, in an embodiment according to the present invention, generally speaking, when the catalyst temperature TC is low, the second $NO_x$ removal method is used, while if the catalyst temperature TC is high, the first $NO_x$ removal method is used.

Figure 16:
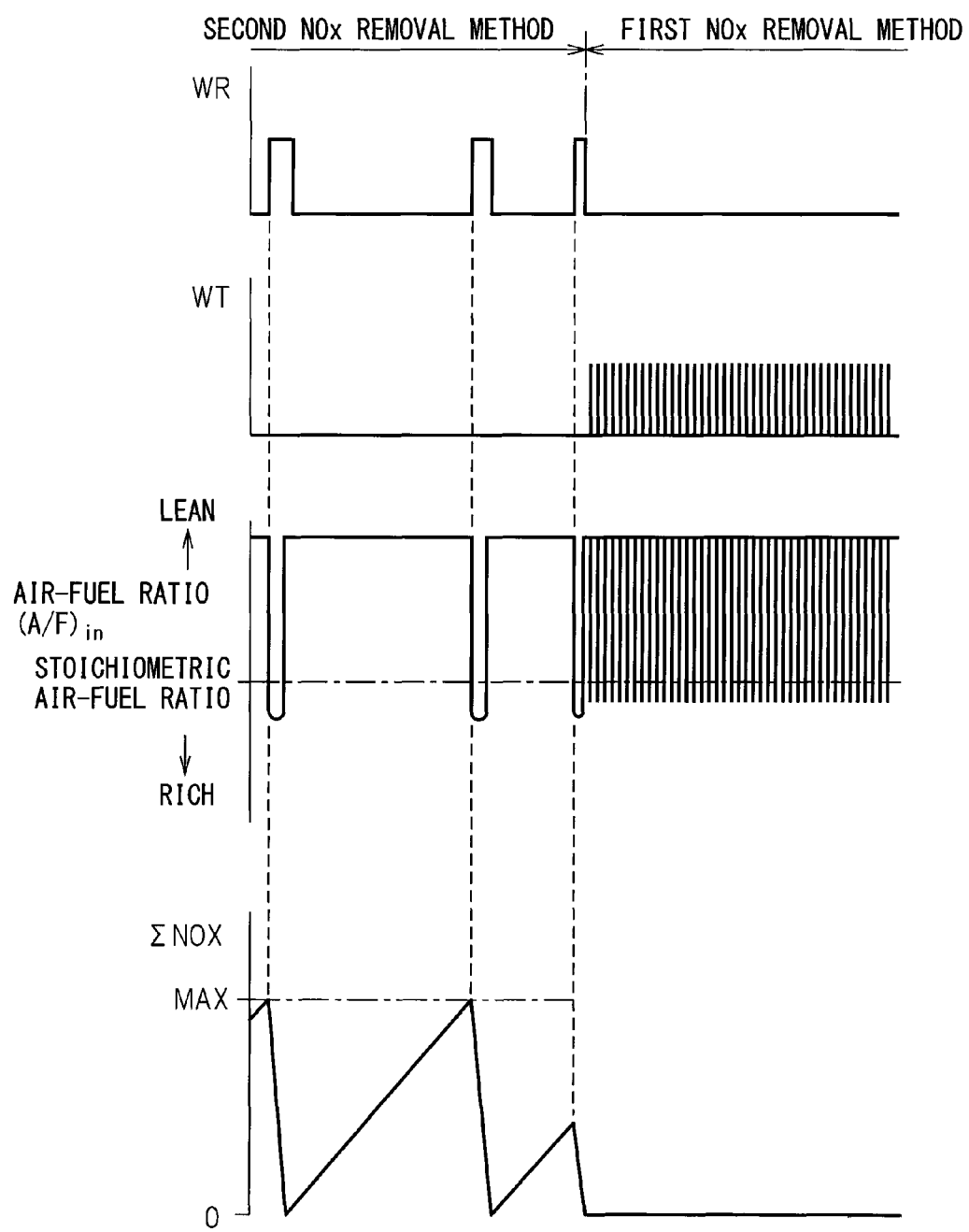
FIG. 16 is a view which shows a change in an air-fuel ratio of exhaust gas flowing into an exhaust purification catalyst, etc when $NO_x$ purification method is changed from a second $NO_x$ purification method to a first $NO_x$ purification method.

Now then, when releasing the stored $NO_x$ from the exhaust purification catalyst 13 in case where the second $NO_x$ removal method is being performed, usually the rich combustion gas generation injection AI for generating combustion gas of a rich air-fuel ratio in the combustion chamber 2 is performed. FIG. 16 shows the change in the amount WR of the rich combustion gas generation injection AI into the combustion chamber 2, the injection timing of hydrocarbons WT from the hydrocarbon feed valve 15, the change in the air-fuel ratio (A/F) in of the exhaust gas flowing into the exhaust purification catalyst 13, and the stored $NO_x$ amount $\Sigma NOX$ stored in the exhaust purification catalyst 13 when the $NO_x$ removal method is switched from the second $NO_x$ removal method to the first $NO_x$ removal method in the state where the exhaust purification catalyst 13 is sufficiently activated and a high $NO_x$ purification rate is obtained. As shown in FIG. 16, when the second $NO_x$ removal method is being performed and the stored $NO_x$ amount $\Sigma NOX$ stored in the basic layer 53 of the exhaust purification catalyst 13 exceeds the allowable amount MAX, the rich combustion gas generation injection AI into the combustion chamber 2 is performed whereby the air-fuel ratio (A/F) in of the exhaust gas flowing into the exhaust purification catalyst 13 is made rich.

On the other hand, when the $NO_x$ removal action is switched from the $NO_x$ removal action by the second $NO_x$ removal method to the $NO_x$ removal action by the first $NO_x$ removal method in the state where $NO_x$ is stored in the exhaust purification catalyst 13, when the $NO_x$ removal action by the first $NO_x$ removal method is started, the $NO_x$ purification rate ends up falling. Further, the $NO_x$ stored in the exhaust purification catalyst 13 ends up being released without being reduced. Therefore, in an embodiment according to the present invention, if $NO_x$ is stored in the exhaust purification catalyst 13 when the $NO_x$ removal action is switched from the $NO_x$ removal action by the second $NO_x$ removal method to the $NO_x$ removal action by the first $NO_x$ removal method, to release and reduce the stored $NO_x$, as shown in FIG. 16, the rich combustion gas generation injection AI into the combustion chamber 2 is performed whereby the air-fuel ratio (A/F) in of the exhaust gas flowing into the exhaust purification catalyst 13 is made temporarily rich.

Figure 17:
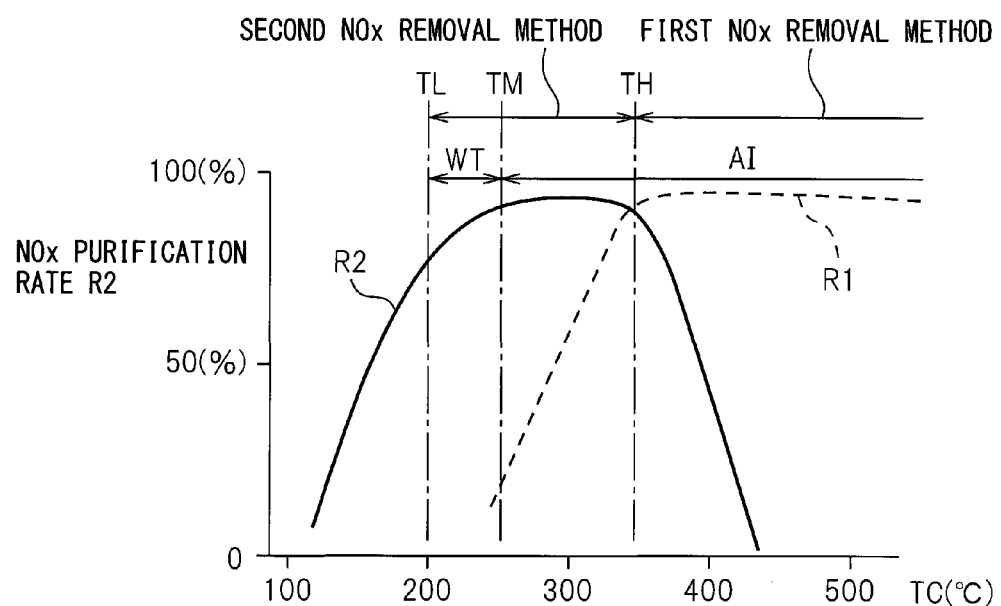
FIG. 17 is a view for explaining a rich control for an $NO_x$ release.

FIG. 17 shows together the $NO_x$ purification rate R1 by the first $NO_x$ removal method shown in FIG. 5 and the $NO_x$ purification rate R2 by the second $NO_x$ removal method shown in FIG. 9. As will be understood if referring to FIG. 17, when the catalyst temperature TC is lower than the temperature TH, the $NO_x$ purification rate R2 by the second $NO_x$ removal method becomes higher, while when the catalyst temperature TC becomes higher than the temperature TH, the $NO_x$ purification rate R1 by the first $NO_x$ removal method becomes higher. Therefore, in an embodiment according to the present invention, when the catalyst temperature TC is lower than the temperature TH, the second $NO_x$ removal method is used, while when the catalyst temperature TC is higher than the temperature TH, the first $NO_x$ removal method is used.

In this regard, as explained above, when the first $NO_x$ removal method is being used, the $NO_x$ contained in the exhaust gas is reduced by the reducing intermediate which is held on the basic layer 53, and the amount of hydrocarbons which is required for generating this reducing intermediate is fed from the hydrocarbon feed valve 15. On the other hand, when the second $NO_x$ removal method is being used, the $NO_x$ which is stored in contained in the exhaust gas is released and reduced by making the air-fuel ratio of the exhaust gas flowing into the exhaust purification catalyst 13 rich. In this regard, to make the $NO_x$ which was once stored in the exhaust purification catalyst 13 be released from the exhaust purification catalyst 13 and be reduced in this way, a large amount of reducing agent becomes necessary.

Therefore, the amount of reducing agent which is required for releasing the stored $NO_x$ from the exhaust purification catalyst 13 and reduce it in the second $NO_x$ removal method, that is, the amount of fuel which is required for making the air-fuel ratio of the exhaust gas rich, is larger compared with the amount of hydrocarbons, that is, the amount of reducing agent, which is required for generating the reducing intermediate in the first $NO_x$ removal method. That is, the amount of reducing agent which is required for removing the $NO_x$ is greater in the case of using the second $NO_x$ removal method compared with the case of using the first $NO_x$ removal method. Therefore, it is preferable to use the first $NO_x$ removal method as much as possible.

Again, referring to FIG. 17, FIG. 17 shows two temperatures TL and TM which are lower than the temperature TH for the temperature TC of the exhaust purification catalyst. The temperature TL is the lowest catalyst temperature which enables the stored $NO_x$ from the exhaust purification catalyst 13 by performing the rich combustion gas generation injection AI into the combustion chamber 2, that is, the allowable lowest temperature. The $NO_x$ purification rate R2 at this allowable lowest temperature TL is the lowest $NO_x$ purification rate which can be practically allowed. Therefore, in other words, the allowable lowest temperature TL is the catalyst temperature TC when the $NO_x$ purification rate R2 becomes the lowest $NO_x$ purification rate which can be practically allowed. On the other hand, the temperature TM shows the upper limit temperature which is higher than this allowable lowest temperature TL, and this upper limit temperature TM is the catalyst temperature TC where the $NO_x$ purification rate R2 by the second $NO_x$ removal method substantially peaks when the temperature TC of the exhaust purification catalyst rises.

Figure 19:
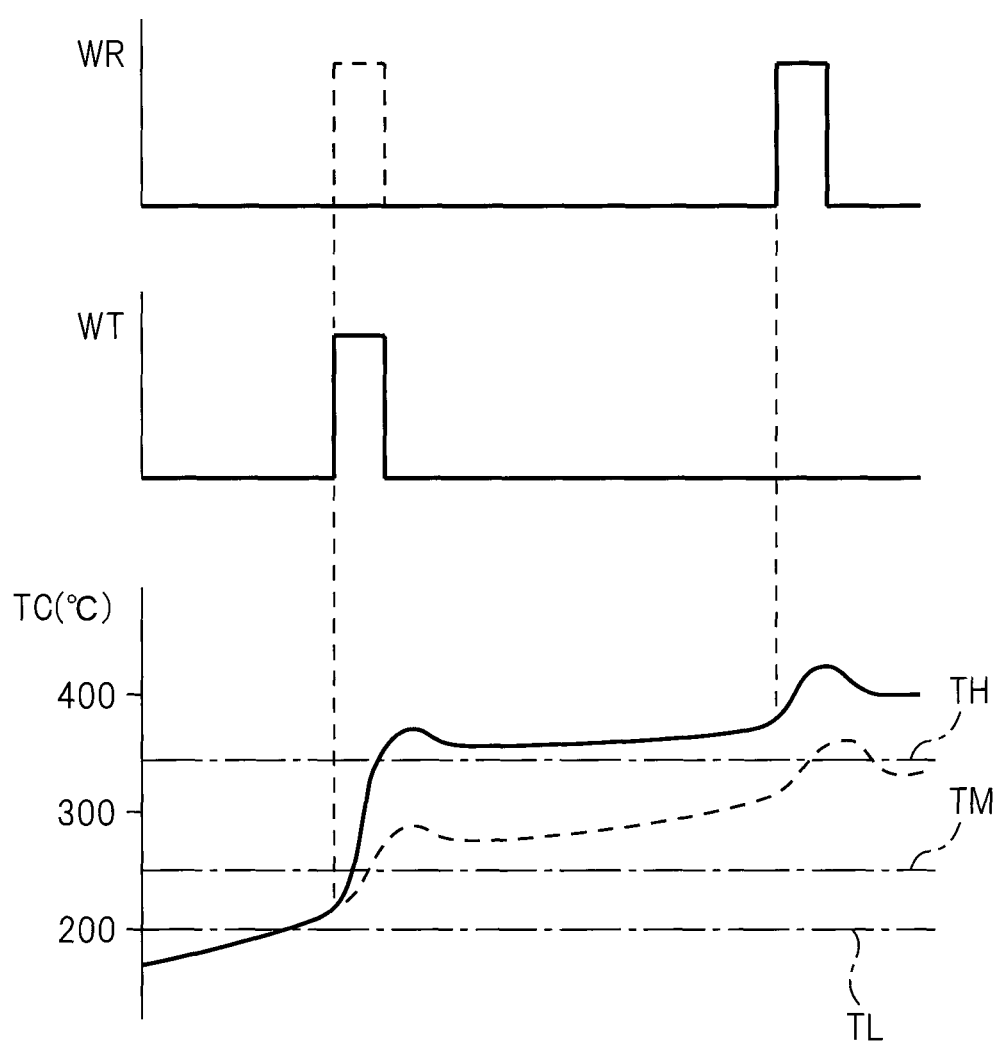
FIG. 19 is a view which shows a change in a temperature of an exhaust purification catalyst when a rich control for an $NO_x$ release is performed.

FIG. 19 shows the changes in injection amount WR of the rich combustion gas generation injection AI, the injection amount WT of hydrocarbons from the hydrocarbon feed valve 15, and the temperature TC of the exhaust purification catalyst. Note that, FIG. 19 shows the case where a command indicating that the stored $NO_x$ should be released from the exhaust purification catalyst 13 is issued when the temperature TC of the exhaust purification catalyst is between the allowable lowest temperature TL and the upper limit temperature TM. Now then, if the rich combustion gas generation injection AI into the combustion chamber 2 is performed, the injected fuel is partially oxidized in the combustion chamber 2 and, as a result, a large amount of $CO_2$ is exhausted from the engine. This $CO_2$ has a strong reducing force. Therefore, if a large amount of $CO_2$ is exhausted from the engine, it is possible to release the stored $NO_x$ from the exhaust purification catalyst 13 and reduce it well. Therefore, when releasing the stored $NO_x$ from the exhaust purification catalyst 13, usually the air-fuel ratio of the exhaust gas flowing into the exhaust purification catalyst 13 is made rich by performing the rich combustion gas generation injection AI into the combustion chamber 2, that is, by generating combustion gas of a rich air-fuel ratio in the combustion chamber 2.

Therefore, even in the case where a command indicating that the stored $NO_x$ should be released from the exhaust purification catalyst 13 is issued when the temperature TC of the exhaust purification catalyst is between the allowable lowest temperature TL and the upper limit temperature TM, as shown in FIG. 19 by the broken line, it is possible to make the air-fuel ratio of the exhaust gas flowing into the exhaust purification catalyst 13 rich by performing the rich combustion gas generation injection AI into the combustion chamber 2, that is, by generating combustion gas of a rich air-fuel ratio in the combustion chamber 2. However, if performing the rich combustion gas generation injection AI into the combustion chamber 2, as explained above, the injected fuel is partially oxidized in the combustion chamber 2. Therefore, at this time, the amount of fuel which is made to burn at the exhaust purification catalyst 13 becomes small and the heat of oxidation reaction which is generated in the exhaust purification catalyst 13 becomes smaller. Therefore, as shown in FIG. 19 by the broken line, at this time, the temperature TC of the exhaust purification catalyst 13 does not rise that much.

On the other hand, at this time, as shown by the solid line in FIG. 19, even if the air-fuel ratio of the exhaust gas flowing into the exhaust purification catalyst 13 is made rich by injecting hydrocarbons from the hydrocarbon feed valve 15, it is possible to release the stored $NO_x$ from the exhaust purification catalyst 13. Furthermore, at this time, if the air-fuel ratio of the exhaust gas flowing into the exhaust purification catalyst 13 is made rich by injecting hydrocarbons from the hydrocarbon feed valve 15, the majority of the injected fuel is oxidized on the exhaust purification catalyst 13. As a result, at this time, a large amount of heat of oxidation reaction occurs, so, as shown by the solid line in FIG. 19, the temperature TC of the exhaust purification catalyst rapidly rises. As a result, the $NO_x$ purification rate R2 peaks and a high $NO_x$ purification rate is obtained. Further, at this time, if the temperature TC of the exhaust purification catalyst exceeds the temperature TH, the $NO_x$ purification action by the first $NO_x$ removal method can be performed.

Figure 18:
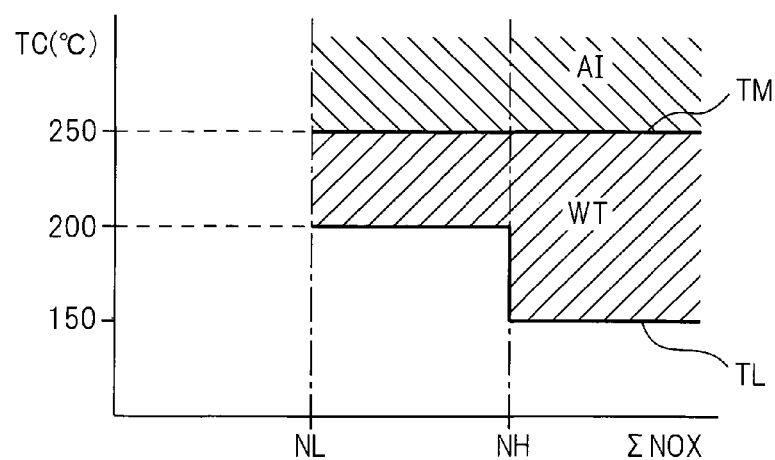
FIG. 18 is a view for explaining a hydrocarbon injection regions, etc when performing a rich control for an $NO_x$ release.

Therefore, when the temperature TC of the exhaust purification catalyst is between the allowable lowest temperature TL and the upper limit temperature TM and a command for release of $NO_x$ from the exhaust purification catalyst 13 is issued, it is preferable to make the air-fuel ratio of the exhaust gas flowing into the exhaust purification catalyst 13 rich by injecting hydrocarbons from the hydrocarbon feed valve 15. FIG. 18 shows the region where when a command for release of $NO_x$ from the exhaust purification catalyst 13 is issued, the air-fuel ratio of the exhaust gas flowing into the exhaust purification catalyst 13 should be made rich by injecting hydrocarbons from the hydrocarbon feed valve 15 by the hatched region WT. Note that, in FIG. 18, the ordinate shows the temperature TC of the exhaust purification catalyst, while the abscissa shows the stored $NO_x$ amount ΣNOX which is stored in the basic layer 53 of the exhaust purification catalyst 13. As shown in FIG. 18, this region WT is between the allowable lowest temperature TL and the upper limit temperature TM, and when a command for release of $NO_x$ from the exhaust purification catalyst 13 is issued, if the point which is determined from the temperature TC of the exhaust purification catalyst and the stored $NO_x$ amount ΣNOX in the exhaust purification catalyst 13 is in this region WT, the air-fuel ratio of the exhaust gas flowing into the exhaust purification catalyst 13 is made rich by injecting hydrocarbons from the hydrocarbon feed valve 15.

Further, in the example shown in FIG. 18, the upper limit temperature TM is made constant regardless of the $NO_x$ amount ΣNOX which is stored in the exhaust purification catalyst 13, and when the temperature TC of the exhaust purification catalyst 13 is higher than this upper limit temperature TM, if a command for release of $NO_x$ from the exhaust purification catalyst 13 is issued, the air-fuel ratio of the exhaust gas flowing into the exhaust purification catalyst 13 is made rich by performing the rich combustion gas generation injection AI. The region where the rich combustion gas generation injection AI is performed in this way is shown by the hatched region AI in FIG. 18. On the other hand, in FIG. 18, when the temperature TC of the exhaust purification catalyst is lower than the allowable lowest temperature TL, even if a command for release of $NO_x$ from the exhaust purification catalyst 13 is issued, the rich combustion gas generation injection AI is not performed and hydrocarbons are also not injected from the hydrocarbon feed valve 15. That is, at this time, the action of release of $NO_x$ from the exhaust purification catalyst 13 is not performed, and when the temperature TC of the exhaust purification catalyst exceeds the allowable lowest temperature TL, the action of release of $NO_x$ from the exhaust purification catalyst 13 is performed by injecting hydrocarbons from the hydrocarbon feed valve 15.

As explained above, when the temperature TC of the exhaust purification catalyst is lower than the allowable lowest temperature TL, the action of release of $NO_x$ from the exhaust purification catalyst 13 is not performed. Therefore, if the engine operation is continued in the state where the temperature TC of the exhaust purification catalyst is lower than the allowable lowest temperature TL, the $NO_x$ amount ΣNOX which is stored in the exhaust purification catalyst 13 gradually increases. In this case, when the $NO_x$ amount ΣNOX which is stored in the exhaust purification catalyst 13 becomes larger, it is preferable to make the exhaust purification catalyst 13 release $NO_x$ even a little. Therefore, in an embodiment according to the present invention, when the $NO_x$ amount ΣNOX which is stored in the exhaust purification catalyst 13 becomes larger, as shown in FIG. 18, the allowable lowest temperature TL is lowered when the $NO_x$ amount ΣNOX which is stored in the exhaust purification catalyst 13 increases so that $NO_x$ can be released from the exhaust purification catalyst 13 even if the temperature TC of the exhaust purification catalyst is low. As a result, in an embodiment according to the present invention, in case where the $NO_x$ amount $\Sigma NOX$ which is stored in the exhaust purification catalyst 13 becomes large, even if the temperature TC of the exhaust purification catalyst is low, when a command for release of $NO_x$ from the exhaust purification catalyst 13 is issued, hydrocarbons are injected from the hydrocarbon feed valve 15 whereby $NO_x$ is released from the exhaust purification catalyst 13.

Figure 20:
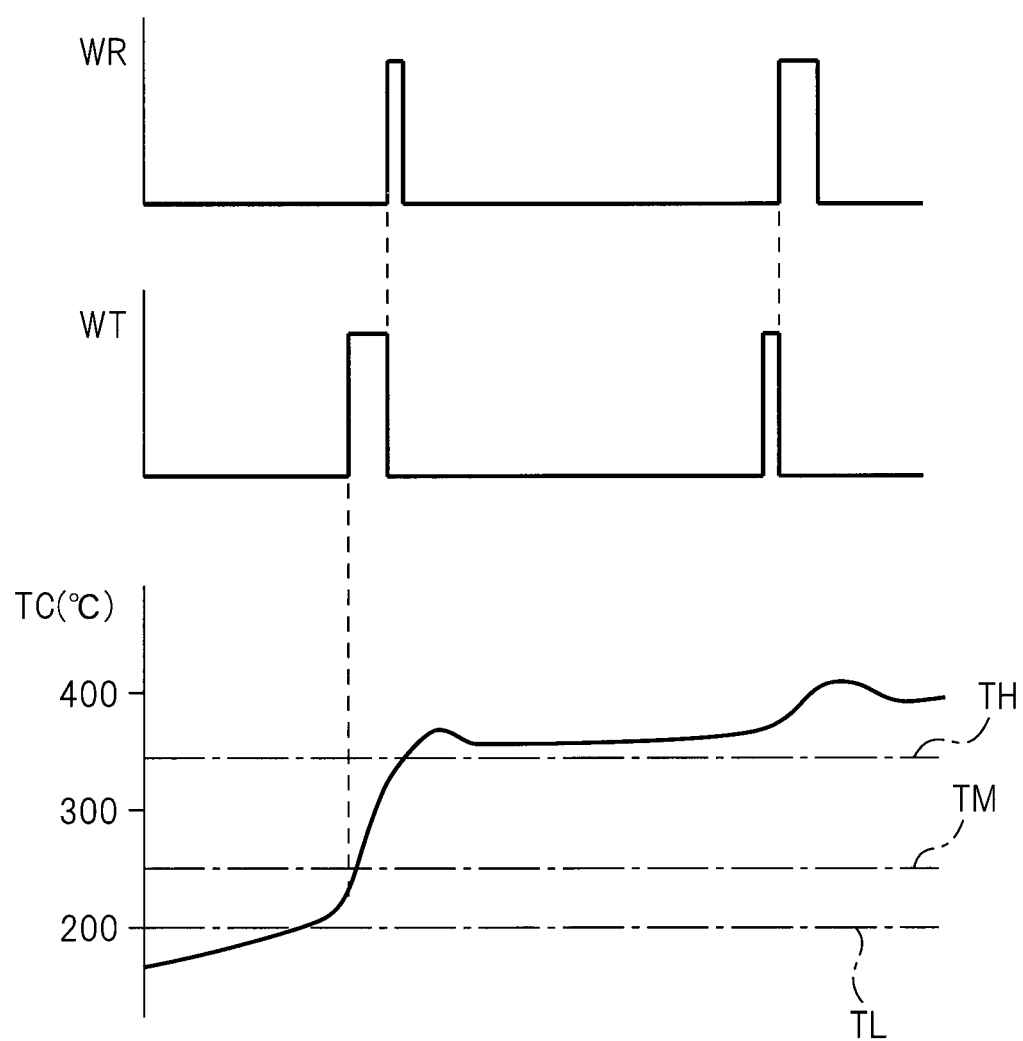
FIG. 20 is a view which shows a change in a temperature of an exhaust purification catalyst when a rich control for an $NO_x$ release is performed.

FIG. 20 shows another example of the case where a command for release of $NO_x$ from the exhaust purification catalyst 13 is issued when the temperature TC of the exhaust purification catalyst is between the allowable lowest temperature TL and the upper limit temperature TM. Note that, FIG. 20, like FIG. 19, shows the change in the injection amount WR of the rich combustion gas generation injection AI, the amount WT of injection of hydrocarbons from the hydrocarbon feed valve 15, and the temperature TC of the exhaust purification catalyst. As shown in FIG. 20, in this example, when a command for release of $NO_x$ from the exhaust purification catalyst 13 is issued, the air-fuel ratio of the exhaust gas flowing into the exhaust purification catalyst 13 is made rich by injecting hydrocarbons from the hydrocarbon feed valve 15 as shown by WT in FIG. 20, and further the air-fuel ratio of the exhaust gas flowing into the exhaust purification catalyst 13 is made rich by performing the rich combustion gas generation injection AI as shown by WR in FIG. 20. Due to this, $NO_x$ is released from the exhaust purification catalyst 13 and the temperature TC of the exhaust purification catalyst rises.

Next, when a command for release of $NO_x$ from the exhaust purification catalyst 13 is issued again after the temperature TC of the exhaust purification catalyst rises, the air-fuel ratio of the exhaust gas flowing into the exhaust purification catalyst 13 is made rich by injecting hydrocarbons from the hydrocarbon feed valve 15 as well, as shown by WT in FIG. 20, and further the air-fuel ratio of the exhaust gas flowing into the exhaust purification catalyst 13 is made rich by performing the rich combustion gas generation injection AI as well, as shown by WR in FIG. 20. However, at this time, compared with the case where a command for release of $NO_x$ from the exhaust purification catalyst 13 is issued first in FIG. 20, the amount WT of injection of hydrocarbons from the hydrocarbon feed valve 15 is made to decrease and the amount WR of injection of fuel by the rich combustion gas generation injection AI is made to increase.

That is, when the temperature TC of the exhaust purification catalyst is low, rather than raising the action of releasing $NO_x$ from the exhaust purification catalyst 13, making the temperature TC of the exhaust purification catalyst rise enables the $NO_x$ purification rate to be improved. Therefore, in the example which is shown in FIG. 20, in case where the temperature TC of the exhaust purification catalyst is low when a command for release of $NO_x$ from the exhaust purification catalyst 13 is issued, a large amount of hydrocarbons are injected from the hydrocarbon feed valve 15 to raise the temperature TC of the exhaust purification catalyst, while when the temperature TC of the exhaust purification catalyst becomes high, the need for making temperature TC of the exhaust purification catalyst rise is eliminated, so the amount WT of injection of hydrocarbons from the hydrocarbon feed valve 15 is decreased. That is, in this example, when the temperature TC of the exhaust purification catalyst is low, compared with when the temperature TC of the exhaust purification catalyst is high, the amount WT of injection of hydrocarbons from the hydrocarbon feed valve 15 is made greater. The same is true in the case which is shown in FIG. 19 as well.

Therefore, in an exhaust purification system of an internal combustion engine in which an exhaust purification catalyst 13 is arranged in an engine exhaust passage and a hydrocarbon feed valve 15 is arranged in the engine exhaust passage upstream of the exhaust purification catalyst 13, a precious metal catalyst 51 being carried on an exhaust gas flow surface of the exhaust purification catalyst 13, a basic layer 53 being formed around the precious metal catalyst 51, and an air-fuel ratio of an exhaust gas flowing into the exhaust purification catalyst 13 being made rich when releasing $NO_x$ which is stored in the basic layer 53 from the exhaust purification catalyst 13, in the present invention, when releasing the stored NOX from the exhaust purification catalyst 13, the air-fuel ratio of the exhaust gas flowing into the exhaust purification catalyst 13 is made rich by generating combustion gas of a rich air-fuel ratio in a combustion chamber 2 or the air-fuel ratio of the exhaust gas flowing into the exhaust purification catalyst 13 is made rich by injecting hydrocarbons from the hydrocarbon feed valve 15 into the engine exhaust passage, and, in case where hydrocarbons are injected from the hydrocarbon feed valve 15 into the engine exhaust passage to release the stored $NO_x$ from the exhaust purification catalyst 13, an amount of injection of hydrocarbons from the hydrocarbon feed valve 15 is made greater when a temperature of the exhaust purification catalyst 13 is low as compared with when the temperature of the exhaust purification catalyst 13 is high.

Note that, in an embodiment according to the present invention, as explained while referring to FIG. 17 and FIG. 18, for the temperature TC of the exhaust purification catalyst, an allowable lowest temperature TL which enables to release the stored $NO_x$ from the exhaust purification catalyst 13 by generating the combustion gas of a rich air-fuel ratio in the combustion chamber 2 and an upper limit temperature TM higher than this allowable lowest temperature TL are set in advance. In addition, as will be understood from FIG. 19 and FIG. 20, in case where hydrocarbons are injected from the hydrocarbon feed valve 15 into the engine exhaust passage to release the stored $NO_x$ from the exhaust purification catalyst 13, when the temperature of the exhaust purification catalyst 13 is between the allowable lowest temperature TL and the upper limit temperature TM, the amount of injection of hydrocarbons from the hydrocarbon feed valve 15 is made greater as compared with when the temperature TC of the exhaust purification catalyst is higher than the upper limit temperature TM.

Further, in the embodiment which is shown in FIG. 19, when releasing the stored $NO_x$ from the exhaust purification catalyst 13 in case where the temperature TC of the exhaust purification catalyst 13 is between the allowable lowest temperature TL and the upper limit temperature TM, the air-fuel ratio of the exhaust gas flowing into the exhaust purification catalyst 13 is made rich by injecting hydrocarbons from the hydrocarbon feed valve 15 into the engine exhaust passage and, when releasing the stored $NO_x$ from the exhaust purification catalyst 13 in case where the temperature TC of the exhaust purification catalyst 13 is higher than the upper limit temperature TM, the air-fuel ratio of the exhaust gas flowing into the exhaust purification catalyst 13 is made rich by generating combustion gas of a rich air-fuel ratio in the combustion chamber 2.

Further, in an embodiment according to the present invention, a first $NO_x$ removal method which reduces $NO_x$ contained in the exhaust gas by a reducing intermediate which is held on the basic layer 53 and generated by injecting hydrocarbons from the hydrocarbon feed valve 15 within a predetermined range of period and a second $NO_x$ removal method in which the air-fuel ratio of the exhaust gas flowing into the exhaust purification catalyst 13 is made rich by a period which is longer than the above-mentioned predetermined range to make the $NO_x$ which was stored in the exhaust purification catalyst 13 when the air-fuel ratio of the exhaust gas flowing into the exhaust purification catalyst 13 was lean be released from the exhaust purification catalyst 13 and be reduced are used. In addition, the upper limit temperature TM is lower than the temperature of the exhaust purification catalyst 13 at which temperature the $NO_x$ removal method is switched from the second $NO_x$ removal method to the first $NO_x$ removal method.

Further, in an embodiment according to the present invention, as shown in FIG. 16, when the $NO_x$ removal method is switched from the second $NO_x$ removal method to the first $NO_x$ removal method, to make the exhaust purification catalyst 13 release the stored $NO_x$, the air-fuel ratio of the exhaust gas flowing into the exhaust purification catalyst 13 is made rich by generating combustion gas of a rich air-fuel ratio in the combustion chamber 2 or the air-fuel ratio of the exhaust gas flowing into the exhaust purification catalyst 13 is made rich by injecting hydrocarbons from the hydrocarbon feed valve 15 into the engine exhaust passage.

Figure 21:
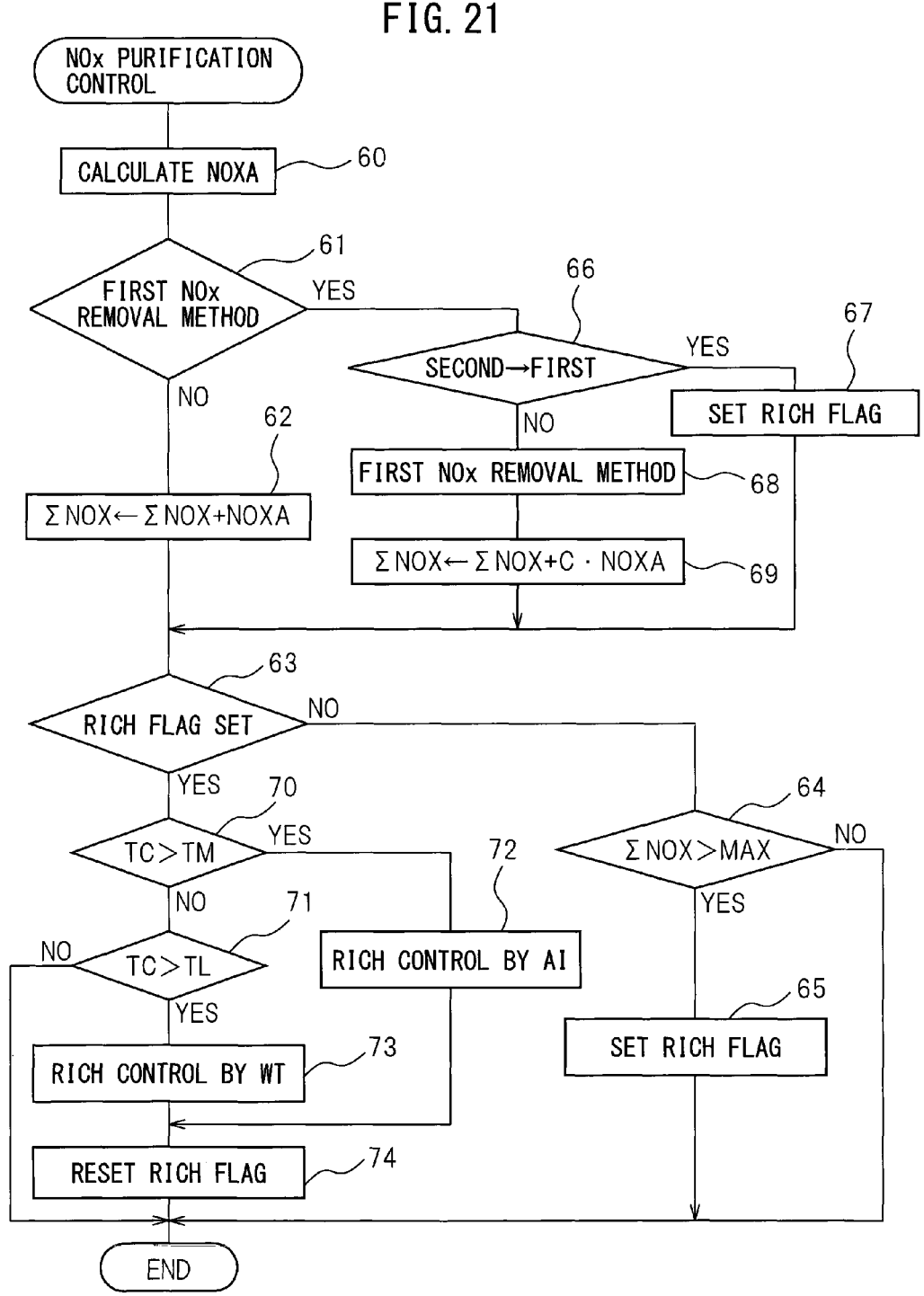
FIG. 21 is a flow chart for performing an $NO_x$ purification control.

FIG. 21 shows an $NO_x$ purification control routine. This routine is executed by interruption every fixed time interval.

Referring to FIG. 21, first, at step 60, the amount NOXA of $NO_x$ exhausted per unit time is calculated from the map which is shown in FIG. 13. Next, at step 61, it is judged from the catalyst temperature of the exhaust purification catalyst 13 etc. whether the first $NO_x$ removal method should be used. When the first $NO_x$ removal method should not be used, that is, when the second $NO_x$ removal method should be used, the routine proceeds to step 62 where the amount NOXA of $NO_x$ exhausted per unit time is added to $\Sigma NOX$ whereby the stored $NO_x$ amount $\Sigma NOX$ is calculated. Next, at step 63, it is judged if a rich flag indicating that the air-fuel ratio of the exhaust gas flowing into the exhaust purification catalyst 13 should be made rich to release the stored $NO_x$ from the exhaust purification catalyst 13 is set. When the rich flag is not set, the routine proceeds to step 64 where it is judged if the stored $NO_x$ amount $\Sigma NOX$ exceeds the allowable value MAX. If $\Sigma NOX > MAX$, the routine proceeds to step 65 where the rich flag is set.

On the other hand, when it is judged at step 61 that the first $NO_x$ removal method should be used, the routine proceeds to step 66 where it is judged if the $NO_x$ removal method has now been switched from the second $NO_x$ removal method to the first $NO_x$ removal method. When it is judged at step 66 that the $NO_x$ removal method has now been switched from the second $NO_x$ removal method to the first $NO_x$ removal method, the routine proceeds to step 67 where the rich flag is set. Next, the routine proceeds to step 63. On the other hand, when it is judged at step 66 that the $NO_x$ removal method has not now been switched from the second $NO_x$ removal method to the first $NO_x$ removal method, the routine proceeds to step 68 where the $NO_x$ removal action by the first $NO_x$ removal method is performed. At this time, from the hydrocarbon feed valve 15, hydrocarbons of the amount WT which is calculated from the map shown in FIG. 11A are injected by a period $\Delta T$ which is calculated from the map shown in FIG. 11B. Next, at step 69, the value C·NOXA which is obtained by multiplying a constant C (<1.0) with the amount NOXA of $NO_x$ exhausted per unit time is added to $\Sigma NOX$ to calculate the stored $NO_x$ amount $\Sigma NOX$. That is, even when the first $NO_x$ removal method is being used, some $NO_x$ is stored at the exhaust purification catalyst 13. Therefore, even when the first $NO_x$ removal method is being used, the stored $NO_x$ amount $\Sigma NOX$ is calculated at step 68. Next, the routine proceeds to step 63.

When it is judged at step 63 that the rich flag is set, the routine proceeds to step 70 where it is judged if the temperature TC of the exhaust purification catalyst is higher than the upper limit temperature TM. When the temperature TC of the exhaust purification catalyst is higher than the upper limit temperature TM, the routine proceeds to step 72 where the air-fuel ratio of the exhaust gas flowing into the exhaust purification catalyst 13 is made rich by performing the rich combustion gas generation injection AI and thereby $NO_x$ is released from the exhaust purification catalyst 13. Next, the routine proceeds to step 74. On the other hand, when it is judged at step 70 that the temperature TC of the exhaust purification catalyst is lower than the upper limit temperature TM, the routine proceeds to step 71 where it is judged if the temperature TC of the exhaust purification catalyst is higher than the allowable lowest temperature TL. When the temperature TC of the exhaust purification catalyst is higher than the allowable lowest temperature TL, the routine proceeds to step 73 where the air-fuel ratio of the exhaust gas flowing into the exhaust purification catalyst 13 is made rich by injecting hydrocarbons from the hydrocarbon feed valve 15 whereby $NO_x$ is released from the exhaust purification catalyst 13. Next, the routine proceeds to step 74. On the other hand, when it is judged at step 71 that the temperature TC of the exhaust purification catalyst is lower than the allowable lowest temperature TL, the processing cycle is ended. At step 74, the rich flag is reset and $\Sigma NOX$ is cleared.

Note that, as another embodiment, it is also possible to arrange an oxidation catalyst for reforming hydrocarbons in the engine exhaust passage upstream of the exhaust purification catalyst 13.

REFERENCE SIGNS LIST 4 intake manifold
5 exhaust manifold
7 exhaust turbocharger
12 exhaust pipe
13 exhaust purification catalyst
14 particulate filter.
15 hydrocarbon feed valve

The invention claimed is:

1. A method of purifying exhaust gas exhausted from an internal combustion engine comprising an exhaust purification catalyst arranged in an engine exhaust passage and a hydrocarbon feed valve arranged in the engine exhaust passage upstream of the exhaust purification catalyst, a precious metal catalyst being carried on an exhaust gas flow surface of the exhaust purification catalyst, a basic layer being formed around the precious metal catalyst, and an air-fuel ratio of an exhaust gas flowing into the exhaust purification catalyst being made rich when releasing $NO_x$ which is stored in the basic layer from the exhaust purification catalyst, wherein when releasing the stored NOx from the exhaust purification catalyst, the air-fuel ratio of the exhaust gas flowing into the exhaust purification catalyst is made rich by generating combustion gas of a rich air-fuel ratio in a combustion chamber or the air-fuel ratio of the exhaust gas flowing into the exhaust purification catalyst is made rich by injecting hydrocarbons from the hydrocarbon feed valve into the engine exhaust passage, wherein, for the temperature of the exhaust purification catalyst, an allowable lowest temperature which enables release of the stored NOx from the exhaust purification catalyst by generating the combustion gas of a rich air-fuel ratio in the combustion chamber and upper limit temperature higher than said allowable lowest temperature are set in advance, and wherein, when the temperature of the exhaust purification catalyst is between said allowable lowest temperature and said upper limit temperature, an amount of injection of hydrocarbons from the hydrocarbon feed valve is made greater as compared with when the temperature of the exhaust purification catalyst is higher than said upper limit temperature.

2. The method of purifying exhaust gas from an internal combustion engine as claimed in claim 1, wherein, when releasing the stored NOx from the exhaust purification catalyst when the temperature of the exhaust purification catalyst is between said allowable lowest temperature and said upper limit temperature, the air-fuel ratio of the exhaust gas flowing into the exhaust purification catalyst is made rich by injecting hydrocarbons from the hydrocarbon feed valve into the engine exhaust passage and, when releasing the stored NOx from the exhaust purification catalyst when the temperature of the exhaust purification catalyst is higher than said upper limit temperature, the air-fuel ratio of the exhaust gas flowing into the exhaust purification catalyst is made rich by generating combustion gas of a rich air-fuel ratio in the combustion chamber.

3. The method of purifying exhaust gas from an internal combustion engine as claimed in claim 1, wherein a first $NO_x$ removal method which reduces $NO_x$ contained in the exhaust gas by a reducing intermediate which is held on the basic layer and generated by injecting hydrocarbons from the hydrocarbon feed valve within a predetermined range of period and a second $NO_x$ removal method in which the air-fuel ratio of the exhaust gas flowing into the exhaust purification catalyst is made rich by a period which is longer than said predetermined range to make the $NO_x$ which was stored in the exhaust purification catalyst when the air-fuel ratio of the exhaust gas flowing into the exhaust purification catalyst was lean be released from the exhaust purification catalyst and be reduced are used, and said upper limit temperature is lower than the temperature of the exhaust purification catalyst at which the $NO_x$ removal method is switched from the second $NO_x$ removal method to the first $NO_x$ removal method.

4. The method of purifying exhaust gas from an internal combustion engine as claimed in claim 1, wherein a first $NO_x$ removal method which reduces $NO_x$ contained in the exhaust gas by a reducing intermediate which is held on the basic layer and generated by injecting hydrocarbons from the hydrocarbon feed valve within a predetermined range of period and a second $NO_x$ removal method in which the air-fuel ratio of the exhaust gas flowing into the exhaust purification catalyst is made rich by a period which is longer than said predetermined range to make the $NO_x$ which was stored in the exhaust purification catalyst when the air-fuel ratio of the exhaust gas flowing into the exhaust purification catalyst was lean be released from the exhaust purification catalyst and be reduced are used, and when the $NO_x$ removal method is switched from the second $NO_x$ removal method to the first $NO_x$ removal method, to make the exhaust purification catalyst release the stored $NO_x$, the air-fuel ratio of the exhaust gas flowing into the exhaust purification catalyst is made rich by generating combustion gas of a rich air-fuel ratio in the combustion chamber or the air-fuel ratio of the exhaust gas flowing into the exhaust purification catalyst is made rich by injecting hydrocarbons from the hydrocarbon feed valve into the engine exhaust passage.

* * * * *